(12) United States Patent
Zhu

(10) Patent No.: US 8,874,789 B1
(45) Date of Patent: Oct. 28, 2014

(54) APPLICATION BASED ROUTING ARRANGEMENTS AND METHOD THEREOF

(75) Inventor: Jialai Zhu, Nanjing (CN)

(73) Assignee: Trend Micro Incorporated, Tokyo (JP)

( * ) Notice: Subject to any disclaimer, the term of this patent is extended or adjusted under 35 U.S.C. 154(b) by 1289 days.

(21) Appl. No.: 11/864,379

(22) Filed: Sep. 28, 2007

(51) Int. Cl.
*G06F 15/173* (2006.01)

(52) U.S. Cl.
USPC ............ 709/242; 709/238; 709/239; 709/240

(58) Field of Classification Search
USPC .................................. 709/242, 238, 239, 240
See application file for complete search history.

(56) References Cited

U.S. PATENT DOCUMENTS

| | | | |
|---|---|---|---|
| 7,007,100 B1* | 2/2006 | Doong et al. ................. | 709/238 |
| 7,334,048 B1* | 2/2008 | Guan et al. .................... | 709/242 |
| 7,457,233 B1* | 11/2008 | Gan et al. ....................... | 370/216 |
| 2001/0017862 A1* | 8/2001 | Tokuyo et al. ................ | 370/401 |
| 2001/0046227 A1* | 11/2001 | Matsuhira et al. ........... | 370/355 |
| 2002/0100034 A1* | 7/2002 | Croix ........................... | 717/163 |
| 2004/0078481 A1* | 4/2004 | Rudd et al. .................... | 709/238 |
| 2004/0085968 A1* | 5/2004 | Chen et al. .................... | 370/397 |
| 2004/0088431 A1* | 5/2004 | Carter ........................... | 709/240 |
| 2005/0055463 A1* | 3/2005 | Saunders et al. .............. | 709/246 |
| 2005/0220098 A1* | 10/2005 | Oguchi et al. ................ | 370/389 |
| 2006/0143703 A1* | 6/2006 | Hopen et al. ................... | 726/15 |
| 2006/0221866 A1* | 10/2006 | Shepherd ...................... | 370/255 |
| 2007/0067469 A1* | 3/2007 | Luik et al. .................... | 709/230 |
| 2007/0074281 A1* | 3/2007 | Ikeda ............................. | 726/13 |
| 2007/0118881 A1* | 5/2007 | Mitchell et al. ................. | 726/4 |
| 2008/0031235 A1* | 2/2008 | Harris et al. ................... | 370/389 |
| 2009/0207817 A1* | 8/2009 | Montemurro et al. ........ | 370/338 |

* cited by examiner

*Primary Examiner* — Rupal Dharia
*Assistant Examiner* — Mohammed Ahmed
(74) *Attorney, Agent, or Firm* — IPSG, P.C. Intellectual Property Law

(57) ABSTRACT

An application-based routing arrangement for routing a plurality of data packets associated with a set of applications partially through a network is provided. The application based policy includes the first set of rules associated with the first application of the set of applications, which includes the first routing specification for routing the first set of data packets. The application routing table is configured to dynamically update the first set of parameters when the first application is connected to the network. The application routing table also includes a hook module to configure the matching of the first data packet associated with the first application against the application routing table to determine the first routing specification using the first routing specification if a match is found.

14 Claims, 5 Drawing Sheets

APPLICATION ROUTING TABLE

170 — Dst ip=x1, dst port=y1, src port=z1, protocol=TCP, route to interface X

Dst ip=x2, dst port=y2, src port=z2, protocol=TCP, route to interface X

Dst ip=x3, dst port=y3, src port=z3, protocol=UDP, route to interface Y

Dst ip=x4, dst port=y4, src port=z4, protocol=TCP, route to Network A

⋮

Dst ip=xn, dst port=yn, src port=zn, protocol=TCP, route to interface Z

APPLICATION BASED ROUTING ARRANGEMENTS AND METHOD THEREOF

BACKGROUND OF THE INVENTION

In a network environment, such as the internet, information may be shared among users even though the users may be geographically dispersed. In a typical day, millions of data packets (e.g., inter protocol packets) ma be shared between users across the network. Those skilled in the art are aware that a network may include a plurality of computer systems connected together via a plurality of network devices (e.g., routers, switches, gateways, firewalls, etc.) over a communication medium (e.g., wired medium, wireless medium, optical medium, and the like). Examples of a network may include, but are not limited to, the internet, a personal area network (PAN), a local area network (LAN), a wide area network (WAN), and the like.

To route a data packet through the network, a protocol stack at each network device (e.g., node) may maintain a routing table to determine the route for transporting the data packet from the source location to the final destination. As discussed herein, a routing table refers to a list that may provide a path for routing a data packet based on the destination address of the data packet. To travel from a source location to a destination location, the data packet may have to "hop" from one network device (e.g., node) to the next. Traditionally, each routing table may only have knowledge of the next "hop". In other words, even though there may be different paths for sending a data packet from a source location to a destination location, the "best route" may have already been established based on cost and nodes (e.g., routers, switches, gateways, firewalls, etc.) availability. Thus, the routing table at each of the node may include the next "hop" that will enable the data packet to be transmitted along the "best route" and reach its final destination.

In an example, an email is sent from location A to a destination B. Upon receiving a data packet associated with the email, a protocol stack in a router may refer to a routing table to determine the path for routing the data packet. The routing table may include the destination address and the path associated with the destination address. Based on the routing table, the protocol stack may be able to route the data packet to the next "hop" along the best route to the destination location.

However, the method of routing data packets primarily based on destination address provides little flexibility for data packets that may need to be sent along a different route. Consider the situation wherein, for example, a user wants to send all entails created by an email application through a secured path, such as a virtual private network (VPN). Even though the user may have this special security requirement, not all emails transmitted will be sent through a secured path. Instead, the path each email may be transmitted may depend upon the destination address of the email. In an example, emails that are sent to destination B may be sent along a secured path; however, emails sent to destination C may be routed along an unsecured path. As a result, the routing table is not able to accommodate the special requirements that a specific application may have since the routing table does not take into account the application source to determine routing.

BRIEF SUMMARY OF THE INVENTION

The invention relates, in an embodiment, to an application-based routing arrangement for routing a plurality of data packets associated with a set of applications partially through a network. The application based policy includes the first set of rules associated with the first application of the set of applications, which includes the first routing specification for routing the first set of data packets. The application routing table is configured to dynamically update the first set of parameters when the first application is connected to the network. The application routing table also includes a hook module to configure the matching of the first data packet associated with the first application against the application routing table to determine the first routing specification using the first routing specification if a match is found.

The above summary relates to only one of the many embodiments of the invention disclosed herein and is not intended to limit the scope of the invention, which is set forth in the claims herein. These and other features of the present invention will be described in more detail below in the detailed description of the invention and in conjunction with the following figures.

BRIEF DESCRIPTION OF THE DRAWINGS

The present invention is illustrated by way of example, and not by way of limitation, in the figures of the accompanying drawings and in which like reference numerals refer to similar elements and in which:

FIG. 1C shows, in an embodiment of the invention, an example of an application routing table.

DETAILED DESCRIPTION OF EMBODIMENTS

Figure 1A:
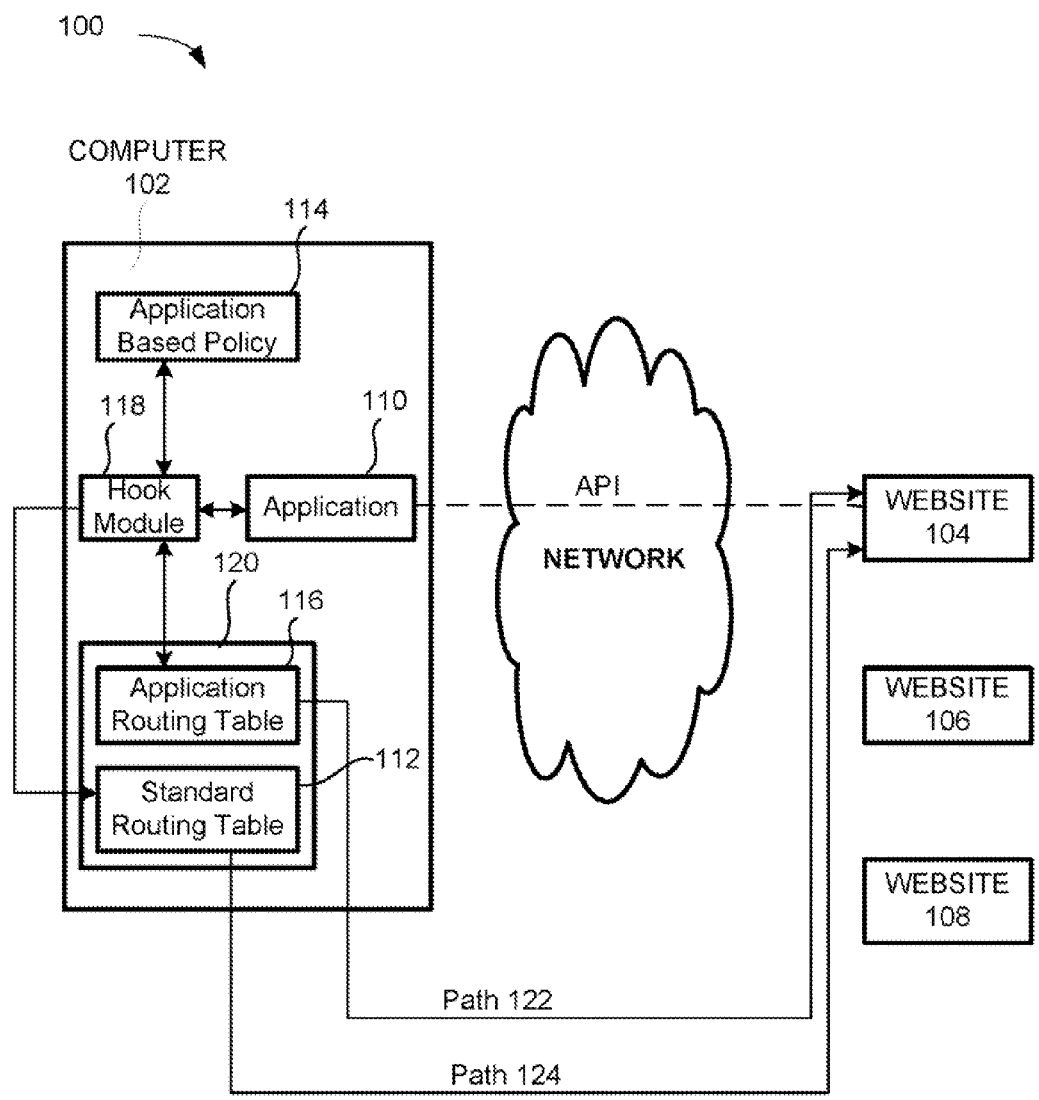
FIG. 1A shows, in an embodiment of the invention, an overall system diagram of an application based routing arrangement.

The present invention will now be described in detail with reference to a few embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known process steps and/or structures have not been described in detail in order to not unnecessarily obscure the present invention.

Various embodiments are described hereinbelow, including methods and techniques. It should be kept in mind that the invention might also cover articles of manufacture that includes a computer readable medium on which computer-readable instructions for carrying out embodiments of the inventive technique are stored. The computer readable medium may include, for example, semiconductor, magnetic, opto-magnetic, optical, or other forms of computer readable medium for storing computer readable code. Further, the invention may also cover apparatuses for practicing embodiments of the invention. Such apparatus may include circuits, dedicated and/or programmable, to carry out tasks pertaining to embodiments of the invention. Examples of such apparatus include a general-purpose computer and/or a dedicated computing device when appropriately programmed and may include a combination of a computer/computing device and dedicated/programmable circuits adapted for the various tasks pertaining to embodiments of the invention.

In one aspect of the invention, the inventor herein realized that routing of a data packet, such as an Internet protocol (IP) packet, may be performed at an application level, thereby enabling applications with special requirements to be accommodated. In accordance with embodiment of the invention, an application-based routing arrangement is provided. Embodiments of the invention include an application based policy for storing rules that may be associated with one or more applications. Embodiments of the invention also include dynamically updating an application routing table based on an API connection established when an application establishes a network connection with a destination.

In one or more embodiments of the invention, an application-based routing arrangement is provided for routing IP packets created by an application through a specified routing specification (e.g., path), regardless of the destination address. In an embodiment of the invention, the application-based routing arrangement may include a hook module, such as a socket API hook. The hook module may get its policy from application based policy and basing on the policy may update application route table. As discussed herein, an application based policy refer to a set of rules that a user may define to provide guidance on how an IP packet for a specific application may be routed. In an example, an IP packet from a specific email application is routed through routing specification X, which may be a virtual private network (VPN).

In embodiment of the invention, the hook module is also configured for at least updating an application routing table. An application routing table is a routing table that is implemented at the same level as the application. In an example, if the application is residing on a personal computer, then the application routing table is also located at the user's personal computer. In another example, if the application is residing at the gateway, then the application routing table is also stored at the gateway level.

As can be appreciated from the foregoing, the application routing table is an additional component that is being added to a routing module, which traditionally has included a standard routing table. Those skilled in the art are aware that a standard routing table may include routing instructions for data packets based on a destination address (e.g., IP address).

In an embodiment, the application routing table may be dynamically updated by the hook module when an API connection is established between an application and a destination. For example, when an application is trying to establish a network connection (e.g., internet connection) with a server, the hook module may update the application routing table with the API parameters. The parameters may include but are not limited to, the protocol (e.g., transmission control protocol, user datagram protocol, etc.) that may be utilized in order to enable the interaction between the source and the destination, the destination address, the destination port, the source port, and the like. In addition, the parameters may be associated with a routing specification for receiving and/or sending the data packets. In an embodiment, the routing specification may be defined in the application based policy.

In an embodiment of the invention, IP packets created by applications that may have rules defined on an application based policy may be routed to its destination address based on the parameters stored on the application routing table. As can be appreciated from the foregoing, IP packets that are routed based on the application routing table are routed based along the same routing specification regardless of the destination IP address stored in the IP packet.

The features and advantages of the present invention may be better understood with reference to the figures and discussions that follow.

FIG. 1A shows, in an embodiment of the invention, an overall system diagram of an application-based routing arrangement 100. Consider the situation, wherein for example, a user at a computer 102 wants to download information from various different websites, such as website 104, 106, and 108 using an application 110 (e.g., browser application). In the prior art, an IP packet sent by application 110 may be routed through a standard routing table 112 in order to determine the routing specification for routing the data packet. Since standard routing table 112 is based on a destination IP address, the routing specification that may have been employed to route the IP packet may depend upon the destination IP address.

Unfortunately, if application 110 has special requirements (e.g., special security requirement) for sending IP packets generated by application 110, standard routing table 112 may not be able to accommodate the special security requirement. In an example, user wants to route all IP packets created by application 110 through a virtual private network (VPN). However, standard routing table 112 may not allow for special accommodation.

In an embodiment, application-based routing arrangement 100 may include an application based policy 114, which includes a set of rules that a user may define to provide guidance on how IP packets with special security requirements may be handled. In an example, application based policy 114 may include a rule indicating that all IP packets generated by application 110 are to be routed through VPN. In another example, application based policy 114 may include another rule indicating that all IP packets generated by application 110 to certain destination addresses are to be routed through a designated routing specification. As can be appreciated from the foregoing, application based policy 114 may include a plurality of rules. Application based policy 114 may be updated as special security requirements are required for new application and/or special security requirements are changed for existing application.

In another embodiment, application-based routing arrangement 100 may include an application routing table 116, which may be updated by a hook module 118, such as a socket API (application programming interface) hook. Hook module 118 may be configured to extract parameters from the API that may be established when an application is trying to interact with another application via the internet. Parameters that may be included on application routing table may include, but are not limited to the protocols utilized, the destination address, the source port, and the destination port. In addition, hook module 118 may associate the API parameters with a routing specification for receiving and/or sending the data packets. In an embodiment, the routing specification may be defined in the application based policy.

Consider the situation wherein, for example, a user at computer 102 wants to download a file from website 104. The user at computer 102 may launch a browser application, such as application 110, and request for connection with website 104. When computer 102 tries to connect with website 104, hook module 118 may be activated.

Figure 1B:
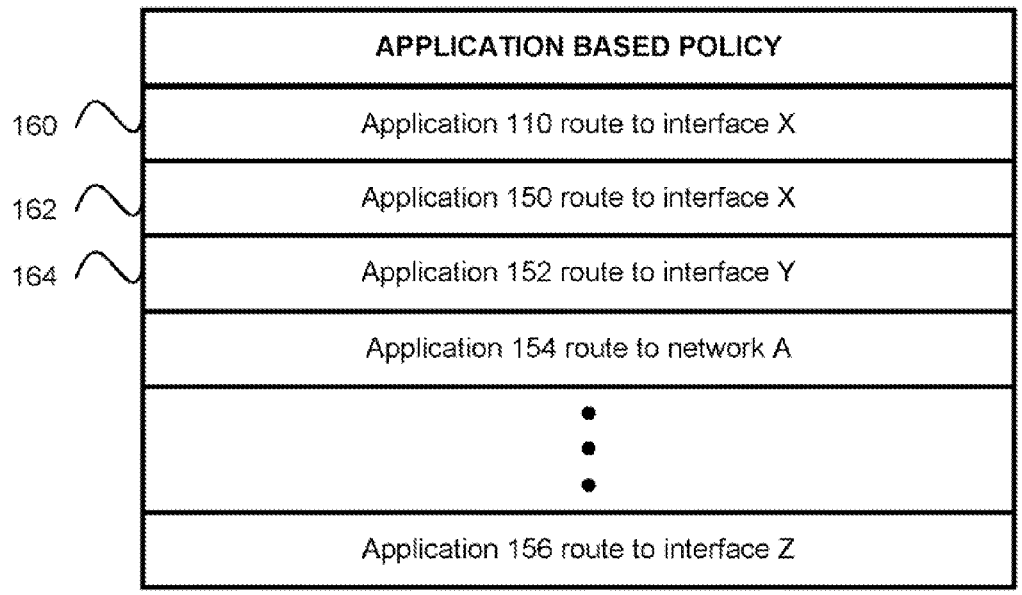
FIG. 1B shows, in an embodiment of the invention, an example of an application based policy.

In an embodiment, hook module 118 may be configured to query application based policy 114 when an API connection is established for an application, such as application 110, to determine if a rule has been established for the application. As aforementioned, application based policy 114 may include rules for routing IP packets created by applications. FIG. 1B shows, in an embodiment of the invention, examples of rules that may be stored in application based policy 114. In an example, if an IP packet is generated by application 110 or 150, the rules may specify routing the IP packet via, routing specification X (as shown in line 160 and line 162). In another example, if an IP packet is generated by application 152, the rules may specify routing the IP packet via routing specification Y (as shown in line 164). In yet another example, if an IP packet is generated by application 154, the rules may specify routing the IP packet to network A. Rules may be added, deleted, and/or changed as needed.

If no rules are created specifically for the application, then no additional steps may need to be performed. However, if a rule exists for application 110, hook module 118 may update application routing table 116 with the API parameters (e.g., protocol utilized, the destination address, the source port, the destination port, etc) and the routing specification for transmitting the data packets as defined in the application based policy. FIG. 1C shows, in an embodiment of the invention, examples of parameters that may be stored in application routing table 116. In an example, routing parameters associated with application 110 may include destination IP address is X1, destination port is Y1, source port is Z1, protocol is TCP, route is routing specification X (as shown in line 170). Thus, with hook module 118, application routing table 116 may be dynamically updated. In other words, parameters may be added and deleted from application routing table 116 when an API connection is established or terminated. In an example, application routing table 116 may be updated each time the destination source changes. Also, each time a destination source is no longer valid, the hook module may remove the parameters associated with the specific destination source from the application routing table.

When an IP packet is sent from application 110 to website 104, a routing module 120 may compare the data stored on application routing table 116 with the data stored in the IP packet. If a match is found, the IP packet may be routed along a path 122 to website 104. In an embodiment, path 122 may be the routing specification that has been defined in application based policy 114 as the path to use in transmitting IP packets generated by application 110. As can be appreciated from the foregoing, the routing specification that may be utilized by the IP packets created by a specific application may be the same regardless of the destination address that may be stored in the IP packet.

However, if a match is not found, then routing module 120 may check standard routing table 112 to determine the route for transmitting the IP packets based on the destination IP address stored within the IP packet. In an example, based on standard routing table 112, the IP packet is to be transmitted along a path 124.

As can be appreciated from the foregoing, by providing an application based routing arrangement, applications with special requirements may be accommodated while still providing a standard routing table to route IP packets that may not have special needs.

Figure 2:
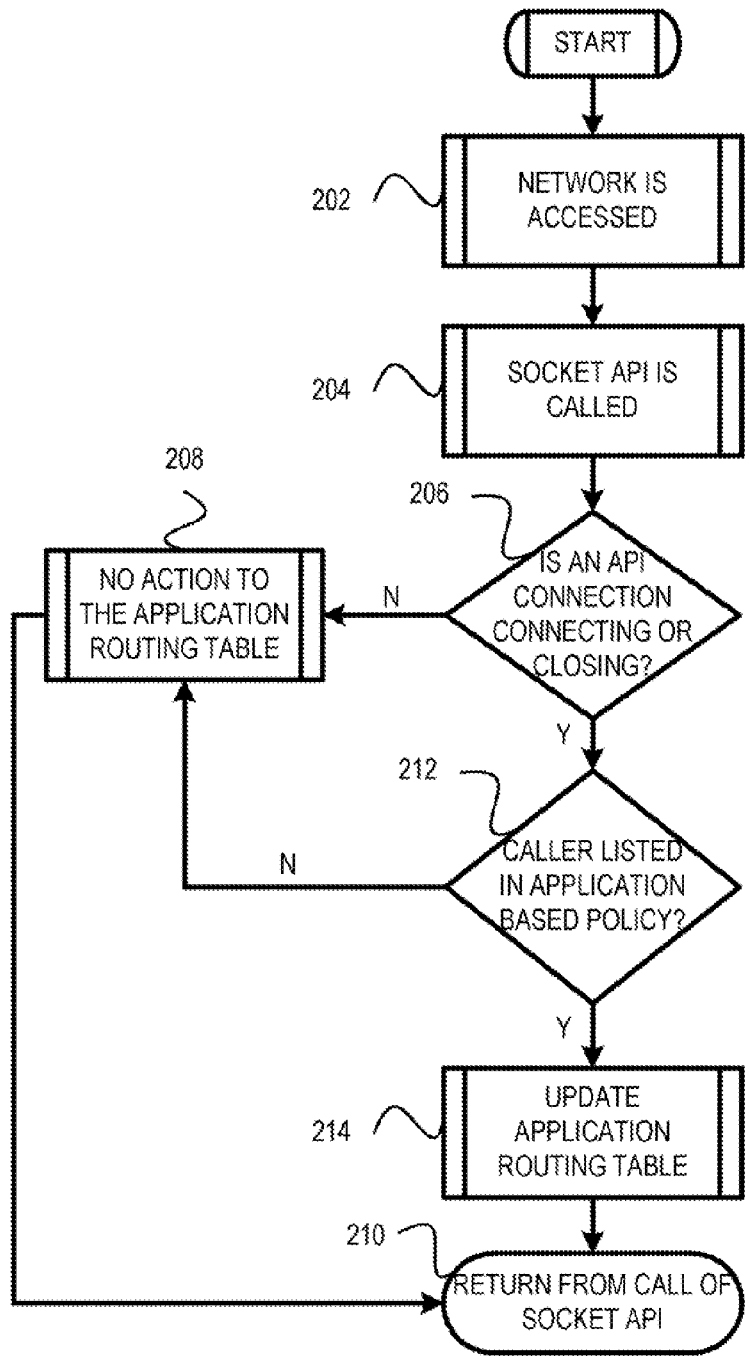
FIG. 2 shows, in an embodiment of the invention, a simple flowchart for managing an application routing table.

FIG. 2 shows, in an embodiment of the invention, as simple flowchart for managing an application routing table.

At a first step 202, a network is accessed. Consider the situation wherein, for example, a user is trying to upload a file to a server via a file transfer protocol (FTP) application. Those skilled in the art are aware that when a network connection is established an API is usually established.

At a next step 204, a socket API hook is call.

At a next step 206, the socket API hook may check the API connection to determine if the API connection is being either connected or being closed. In an example, an API connection is being connected if the FTP application is connecting to the server for the first time. In another example, an API connection is being closed if the FTP application is terminating its connection with the server.

If the API connection is not being either connected or closed, then at a next step 208, the application routing table is not modified.

At a next step 210, the socket API hook may be returned from call (e.g., deactivated).

Referring back to step 206, if the API connection is either connected or closed, then at a next step 212, the socket API hook may checks to see if a rule is available for the caller (e.g., FTP application) within an application based policy.

If no rule is established for the application, then at step 208, the application routing table is not modified.

However, if a rule exists for the application, then at a next step 214, the socket API hook may dynamically update the application routing table. In an embodiment, if the API connection is being established, then the application routing table may be updated with the API parameters (e.g., destination port, destination IP, source port, protocol, etc.). However, if the API connection is being closed, then the API parameters associated with the FTP application may be deleted from the application routing table.

After the application route table has been updated, the socket API hook may be deactivated at step 210.

Figure 3:
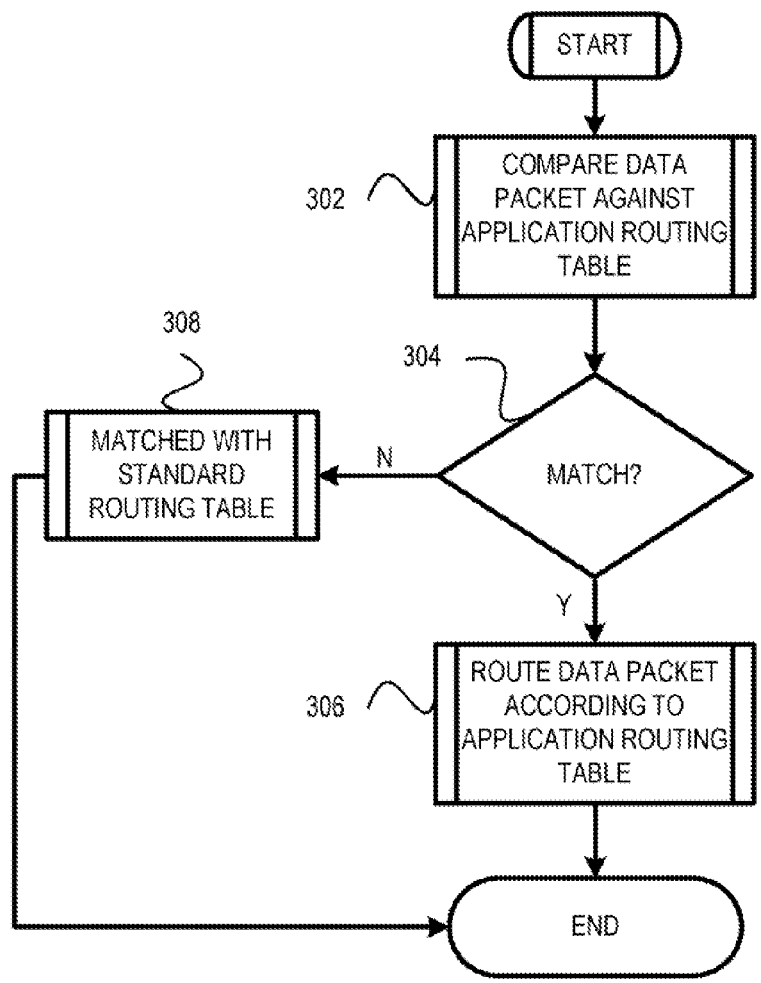
FIG. 3 shows, in an embodiment of an invention, a simple block diagram illustrating packet matching in a routing module.

FIG. 3 shows, in an embodiment of an invention, a simple block diagram illustrating packet matching in a routing module. Consider the situation wherein, for example, IP packets are being generated by an application.

At a first step 302, an IP data packet from the application is compared against an application routing table.

At a next step, 304, a match is determined. In other words, the data stored in the IP packet is compared against the parameters stored on the application routing table.

If a match exists, then at a next step 306, the IP packet is routed in accordance with the parameters stored in the application routing table. In an example, if an IP packet is created by an application A, then the IP packet is routed along routing specification X as defined in the application routing table, which is based on the rules stored in the application based policy.

However, if a match does not exist, then at a next step 308, the IP packet is routed based on the standard routing table. In an example, the IP packet is routed according to the destination IP address of the IP packet.

As can be appreciated from the forgoing, one or more embodiments of the present invention provide for an application base routing arrangement which supports IP packets that may have special requirements while still being configured to be capable of routing standard IP packets through the traditional routing arrangement. With the application based routing arrangement, users are empowered by being able to establish rules for applications that may have special routing requirements.

While this invention has been described in terms of several preferred embodiments, there are alterations, permutations, and equivalents, which fall within the scope of this invention. Although various examples are provided herein, it is intended that these examples be illustrative and not limiting with respect to the invention.

Also, the title and summary are provided herein for convenience and should not be used to construe the scope of the claims herein. Further, the abstract is written in a highly abbreviated form and is provided herein for convenience and thus should not be employed to construe or limit the overall invention, which is expressed in the claims. If the term "set" is employed herein, such term is intended to have its commonly understood mathematical meaning to cover zero, one, or more than one member. It should also be noted that there are many alternative ways of implementing the methods and apparatuses of the present invention. It is therefore intended that the following appended claims be interpreted as including all such alterations, permutations, and equivalents as fall within the true spirit and scope of the present invention.

What is claimed is:

1. An application-based routing arrangement for routing a plurality of data packets associated with a set of applications at least partially through a network, said set of applications including at least a first application, said plurality of data packets including at least a first set of data packets associated with said first application, said application-based routing arrangement comprising:

an application based policy, said application based policy including at least a first set of rules associated with said first application, said first set or rules including at least a first routing specification for routing said first set of data packets;

an application routing table separate from said application based policy;

a hook module, said hook module being configured to query said application based policy to obtain said first set of rules, said hook module being further configured to update said application routing table with a first set of routing parameters according to said first set of rules to make said first set of routing parameters exist in said application routing table, said first set of routing parameters including at least a first destination address, said hook module being further configured at least for updating, responsive to said first application establishing a connection, said application routing table with a second set of routing parameters, said hook module being further configured at least for deleting at least one of said first set of routing parameters and said second set of routing parameters from said application routing table said deleting being responsive to said first application being disconnected from said network;

a routing module configured to route said first set of data packets to said first destination address according to said first set of routing parameters in said application routing table;

said hook module is further configured to remove said second set of routing parameters from said application routing table, said second set of routing parameters being associated with a second application of said set of applications, said routing module is further configured to determine whether said second set of routing parameters exists in said application routing table, and said hook module is further configured to remove said second set of routing parameters from said application routing table, said second set of routing parameters being associated with a second application of said set of applications, said routing module is further configured to determine whether said second set of routing parameters exists in said application routing table, and said routing module is further configured to route a second set of data packets to a second destination address after said routing module has determined that second set of routing parameters does not exist in said application routing table, said second set of data packets being generated by said second application of said set of applications, said second destination address being stored in said second set of data packets; and circuits for performing tasks associated with one or more of said application based policy, said application routing table, said hook module, and said routing module;

matching, using said programmed computing device, said first set of data packets against said application routing table; if a match between said first set of data packets and said application routing table is found, sending, using said programmed computing device, said first set of data packets using a routing specification included in said first set of rules, and if no match between said first set of data packets and said application routing table is found, sending, using said programmed computing device, said first data packet according to a standard routing table.

2. The application-based routing arrangement of claim 1 wherein said hook module is configured for at least checking said application based policy to determine if said first set of rules has been established for said first application, said checking is being responsive to said first application being connected to said network.

3. The application-based routing arrangement of claim 1 wherein said hook module is a socket application programming interface (API) hook configured to extract API parameters from an API when said first application is trying to interact with another application via the Internet.

4. The application-based routing arrangement of claim 1 wherein said first set of parameters including at least said first destination address, a source address, a destination port, a source port, a control protocol, and said first routing specification, said first destination address being different from a second destination address, said second destination address being stored in said first set of data packets.

5. The application-based routing arrangement of claim 1 wherein a second routing specification for routing said first data packet is determined by a standard routing table when a match between said first application and said application routing table is not found.

6. A method for routing a plurality of data packets associated with a set of applications at least partially through a network, said set of applications including at least a first application, said plurality of data packets including at least a first set of data packets associated with said first application, said method comprising:

checking, using a programmed computing device, an application based policy to determine whether a first set of rules has been established for routing packets associated with said first application, said application based policy being configured to include a set of rules for routing data packets associated with said set of applications;

if said first set of rules exists updating, using said programmed computing device, an application routing table with a first set of routing parameters according to said first set of rules to make said first set of routing parameters exist in said application routing table, said first set of routing parameters including at least a first destination address, said first set of routing parameters being associated with said first application, said updating being responsive to said first application being connected to said network;

rotating, using said programmed computing device, said first set of data packets to said first destination address according to said first set of routing parameters;

updating, using said programmed computing device, said application routing table with a second set of routing parameters, responsive to said first application establishing a connection with a second destination address, said second set of routing parameters including at least said second destination address and said routing specification, said routing specification being defined based on said first set of rules stored on said application based policy;

deleting, using said programmed computing device, at least one of said first set of routing parameters and said second set of routing parameters from said application routing table, said deleting being responsive to said first application being disconnected from said network;

removing, using said programmed computing device, said second set of routing parameters from said application routing table, said second set of routing parameters being associated with a second application of said set of applications:

determining, using said programmed computing device, whether said second set of routing, parameters exists in said application routing table; and routing using said programmed computing device, a second set of data packets to a second destination address after ascertaining that said second set of routing parameters does not exist in said application routing table, said second set of data packets being generated by said second application of said set of applications, said second destination address being stored in said second set of data packets;

matching, using said programmed computing device, said first set of data packets against said application routing table; if a match between said first set of data packets and said application routing table is found, sending, using said programmed computing device, said first set of data packets using a routing specification included in said first set of rules, and if no match between said first set of data packets and said application routing table is found, sending, using said programmed computing device, said first data packet according to a standard routing table.

7. The method of claim 6 wherein a hook module is employed to perform said checking, said checking being responsive to said first application being initially connected to said network.

8. The method of claim 7 wherein said hook module is employed to perform said updating on said application routing table, and wherein said hook module is a socket application programming interface (API) hook configured to extract API parameters from an API when said first application is trying to interact with another application via the Internet.

9. The method of claim 6 wherein said first set of parameters including at least said first destination address, a source address, a destination port, a source port, a control protocol, and said routing specification, said first destination address being different from a second destination address, said second desalination address being stored in said first set of data packets.

10. A method for routing a plurality of data packets associated with a set of applications at least partially through a network, said set of applications including at least a first application, said plurality of data packets including at least a first set of data packets associated with said first application, said method comprising:

checking using a programmed computing device, an application based policy to determine whether a first set of rules has been established for routing packets associated with said first application, said application based policy being configured to include a set of rules for routing data packets associated with said set of applications;

if said first set of rules exists, updating, using said programmed computing device, an application routing table with a first set of routing parameters according to said first set of rules to make said first set of routing parameters exist in said application routing table, said first set of routing parameters including at least a first destination address, said first set of routing parameters being associated with said first application, said updating being responsive to said first application being connected to said network;

routing, using said programmed computing device, said first set of data packets to said first destination address according to said first set of routing parameters;

updating, using said programmed computing device, said application routing table with a second set of routing parameters, responsive to said first application establishing a connection with a second destination address, said second set of routing parameters including at least said second destination address and said routing specification, said routing specification being defined based on said first set of rules stored on said application based policy;

deleting, using said programmed computing device, at least one of said first set of routing parameters and said second set of routing parameters from said application routing table, said deleting being responsive to said first application being disconnected from said network;

removing, using said programmed computing device, said second set of routing parameters from said application routing table, said second set of routing parameters being associated with a second application of said set of applications:

determining, using said programmed computing device, whether said second set of routing, parameters exists in said application routing table; and routing using said programmed computing device, a second set of data packets to a second destination address after ascertaining that said second set of routing parameters does not exist in said application routing table, said second set of data packets being generated by said second application of said set of applications, said second destination address being stored in said second set of data packets;

matching, using said programmed computing device, said first set of data packets against said application routing table; if a match between said first set of data packets and said application routing table is found, sending, using said programmed computing device, said first set of data packets using a routing specification included in said first set of rules, and if no match between said first set of data packets and said application routing table is found, sending, using said programmed computing device, said first data packet according to a standard routing table.

11. The application based routing arrangement of claim 1 wherein said hook module is coupled between said application based policy and said application routing table.

12. The application-based roaming arrangement of claim 1 wherein said routing module includes at least both said application routing table and a standard routing table, said routing module set sending a second set of data packets according to said standard routing table when no routing parameters associated with a second application exist in said application routing table, said second set of data packets being associated with said second application.

13. The method of claim 6 further comprising:
receiving, using said programmed computing device, said first set of rules, set first set of rules being defined by a user of said programmed computing device; and
including, using said programmed computing device, said first set of rules in said application based policy.

14. The method of claim 6 wherein said first set of rules requires that said first set of data packets be routed through a virtual private network.

* * * * *